United States Patent
Shimada et al.

(10) Patent No.: US 6,922,335 B2
(45) Date of Patent: Jul. 26, 2005

(54) PORTABLE INFORMATION PROCESSOR AND METHOD OF MANUFACTURING ENCLOSURE OF THE SAME

(75) Inventors: Isao Shimada, Hyogo (JP); Akira Iwamoto, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 156 days.

(21) Appl. No.: 10/338,322

(22) Filed: Jan. 8, 2003

(65) Prior Publication Data

US 2003/0137801 A1 Jul. 24, 2003

(30) Foreign Application Priority Data

Jan. 9, 2002 (JP) ........................................ 2002-001995

(51) Int. Cl.[7] ................................................ G06F 1/16
(52) U.S. Cl. ...................... 361/683; 361/679; D14/314; D19/319
(58) Field of Search ................................ 361/679–868; D14/314, 315; D19/319–327

(56) References Cited

U.S. PATENT DOCUMENTS

| | | | | |
|---|---|---|---|---|
| D353,133 S | * | 12/1994 | Yamada et al. | D14/325 |
| D364,606 S | * | 11/1995 | Bliven | D14/327 |
| D388,063 S | * | 12/1997 | Kim | D14/326 |
| D407,387 S | * | 3/1999 | Smith et al. | D14/325 |
| D456,803 S | * | 5/2002 | Yamada | D14/324 |
| D483,356 S | * | 12/2003 | Kobayashi | D14/318 |
| 6,717,801 B1 | * | 4/2004 | Castell et al. | 361/683 |
| 2002/0126445 A1 | * | 9/2002 | Minaguchi et al. | 361/683 |
| 2003/0198009 A1 | * | 10/2003 | Homer et al. | 361/683 |

FOREIGN PATENT DOCUMENTS

JP          09-062400          3/1997

\* cited by examiner

*Primary Examiner*—Lisa Lea-Edmonds
(74) *Attorney, Agent, or Firm*—RatnerPrestia

(57) ABSTRACT

A back enclosure has a stepped portion disposed perpendicularly to one side of a rectangular flat portion. The stepped portion is extended from the one side to a side opposite to it and virtually parallel to a flow of a molten material. With the described configurations, the enclosure can be reduced in thickness without lowering its strength and, in addition, can be manufactured without impairing moldability of the molten metal in the course of the manufacture of it by metal molding. Thus with such a back enclosure, a portable information processor being lighter and yet having a higher withstanding strength against external forces can be provided.

13 Claims, 4 Drawing Sheets

PORTABLE INFORMATION PROCESSOR AND METHOD OF MANUFACTURING ENCLOSURE OF THE SAME

TECHNICAL FIELD

The present invention generally relates to a portable information processor such as a notebook-size computer and more particularly relates to a portable information processor using a metallic enclosure.

BACKGROUND ART

In recent years, in order to enhance portability of portable information processors such as notebook-size computers, there have been made advances in production of thinner and lighter design of the processors themselves and also of thinner enclosures forming outer cases of the processors. Meanwhile, the enclosure is being made of a metallic material for improvement of its mechanical strength, for electromagnetic shielding, and for radiation of heat developed inside the apparatus.

A conventional portable information processor will be described below with reference to the accompanying drawings.

FIGS. 2A and 2B show external views in perspective of the conventional portable information processor, FIG. 2A shows its state having a display portion opened and FIG. 2B shows its state having the display portion closed. FIG. 3 is a sectional view of the display portion. In the drawings, display portion 22 is joined to body portion 21 of the portable information processor by a hinge assembly (not shown) for opening and closing. Display portion 22 has a liquid crystal display unit 25 disposed between back enclosure 23 and front enclosure 24. Back enclosure 23 is formed of a metallic material such as aluminum for improvement of the mechanical strength, electromagnetic shielding, and radiation of heat generated inside the apparatus. For weight reduction, especially in recent years, use of magnesium alloy having smaller specific gravity and greater strength than aluminum has come to be more prevalent. In addition, the enclosure is formed so as to have the thinnest possible wall thickness.

Portable information processors in general, as they are called "note" or "book", are shaped in a flat and low box form having a virtually rectangular flat portion so that they may be easily put in a brief case or the like. There are one type having the display portion and the body portion joined together via a hinge assembly as shown in FIG. 2A and another type in which the liquid crystal display unit is built into the body portion.

In recent years, the technology of producing thinner and lighter portable information processor has made progress and accordingly the chances are increasing of the processors being carried around by being put in a brief case or the like. However, in a case where the user carrying the processor gets on a crowded train, for example, the brief case receives a high pressure from outside. At this time, external force F as shown in FIG. 3 is applied to display portion 22. This external force F causes deformation in thin-walled back enclosure 23 and produces such a trouble as breakage of liquid crystal display unit 25 housed therein. To prevent this, such methods as to increase the basic wall thickness of the enclosure or to dispose a number of ribs (protrusions) on the interior of the enclosure are considered. However, when these measures are taken, the portable information processors are prevented from being thin-walled and light-weighed and, hence, their portability is impaired. Further, when a number of ribs are provided, cavitations occur in the molding process of the enclosure at the portions where the shape is uneven. As a result, such problems as formation of molten-metal wrinkles or cracks arise, which not only greatly reduces the yields but also leads to increase in weight of the enclosure. Accordingly, approximately 1 mm is considered to be the smallest possible basic wall thickness of the enclosure of conventional portable information processors.

SUMMARY OF THE INVENTION

A portable information processor is configured such that its metallic enclosure provided with a rectangular flat portion has a stepped portion arranged perpendicularly to one side of the flat portion. The method of manufacturing the enclosure comprises the steps of melting a metal, pouring the molten metal into a rectangular shaping mold, and allowing a flow of the molten metal to be produced from a pouring gate made in one side of the shaping mold toward a side opposite to that side, in which the shaping mold has a stepped portion extended in parallel with the direction of the molten metal flow.

DETAILED DESCRIPTION OF THE INVENTION

Figure 1A:
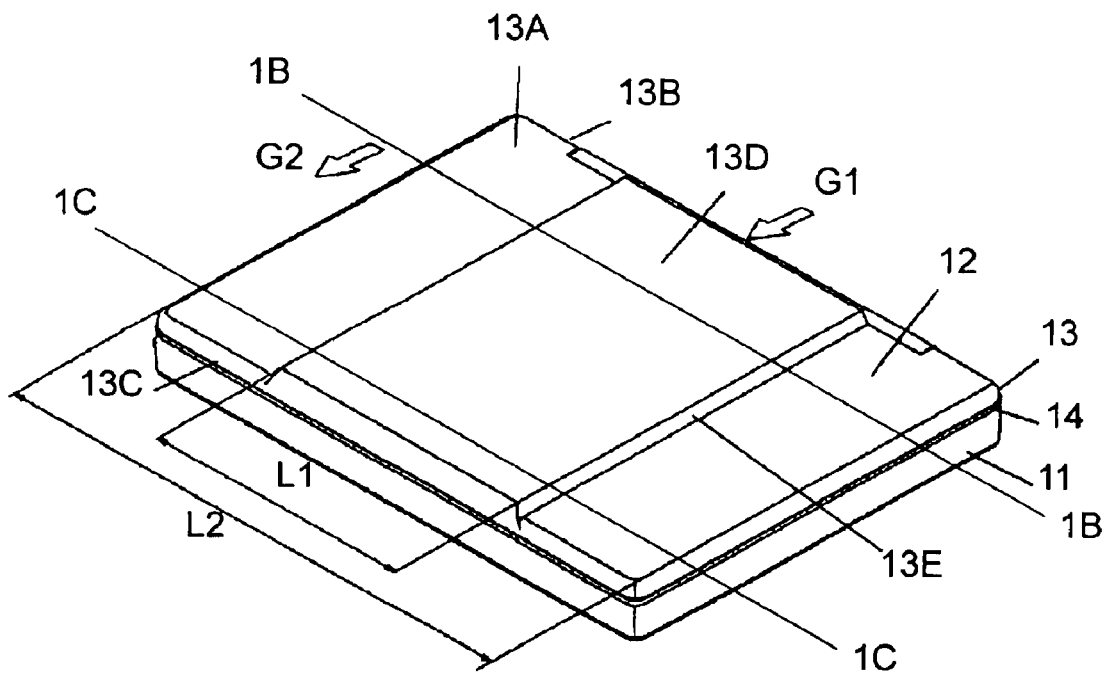
FIG. 1A is an external view in perspective of a portable information processor as a preferred embodiment of the present invention showing a state with its display portion closed.
Figure 1B:
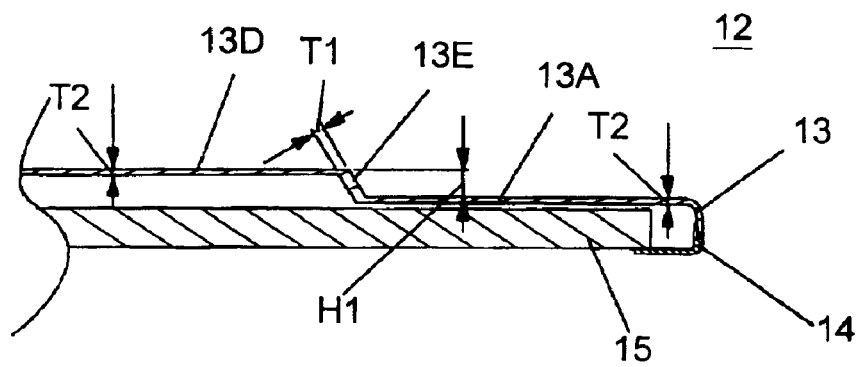
FIG. 1B is a partial sectional view taken along the line X–X' of FIG. 1A of the display portion of the portable information processor as the preferred embodiment of the invention.

A portable information processor of a preferred embodiment of the preset invention is shown in FIGS. 1A to 1D, FIG. 1A is an external view in perspective of the processor with its display portion closed and FIG. 1B is a partial sectional view of the display portion. In FIGS. 1A and 1B, body enclosure 11 and display portion 12 are coupled together via a hinge assembly (not shown) for opening and closing. In the case of FIGS. 1A and 1B, both the portions joined together form a flat box. In display portion 12, there is disposed a liquid crystal display unit 15 between back enclosure 13 and front enclosure 14. For improvement of mechanical strength, electromagnetic shielding, and radiation of the heat generated within the apparatus, back enclosure 13 is formed of a magnesium alloy, which has a smaller specific gravity and higher mechanical strength than aluminum. Also, body enclosure 11 is formed of the same material.

Back enclosure 13 has elevated portion 13D upheaved at a center portion and has a stepped portion with respect to flat portion 13A. Riser portion 13E of elevated portion 13D is formed to extend from side 13B to side 13C virtually in parallel with direction G2. By forming such a stepped portion along direction G2, i.e., perpendicularly to side 13B, the strength of the back enclosure against external forces can be enhanced. Formation of elevated portion 13D and provision of a plurality of stepped portions still enhances the strength. Further, formation of elevated portion 13D in the center portion of back enclosure 13 strengthen the portion which is most liable to deform when subjected to external forces. Relationship of width L1 of elevated portion 13D to entire width L2 of back enclosure 13 is set to satisfy $\frac{1}{3} \leq L1/L2 \leq \frac{2}{3}$ or, preferably, $L1/L2=\frac{1}{2}$. By providing such configurations, the deformation of the center portion of back enclosure 13 under the application of external force F can be reduced. Further, material wall thickness T1 of riser portion 13E of elevated portion 13D relative to basic wall thickness T2 of flat portion 13A of back enclosure 13 is set to satisfy T1>T2. By making such a configuration, the center portion of back enclosure 13 can be provided with still stronger resistance against external forces. Further, fluidity of molten metal is bettered so that occurrence of cavitation can be reduced and production of defective components due to formation of molten-metal wrinkles and occurrence of cracks can be minimized.

Back enclosure 13 is molded this way. Namely, molten material of magnesium alloy is poured into a shaping mold by injection or the like from pouring gate G1 (not shown because it is removed after the molding is completed) made at a potion on the side of one side 13B of rectangular flat portion 13A. And the molten metal is caused to flow in the direction of opposite side 13C at the end of the mold. By this arrangement the molten metal is given good fluidity during the molding process.

Figure 1C:
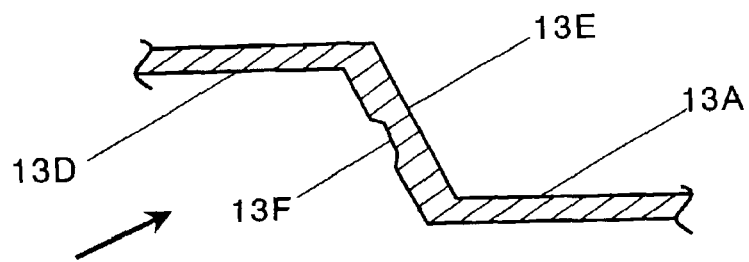
FIG. 1C is an enlarged partial sectional view taken along the line Y–Y' of FIG. 1A of the display portion of the portable information processor as the preferred embodiment of the invention.
Figure 1D:
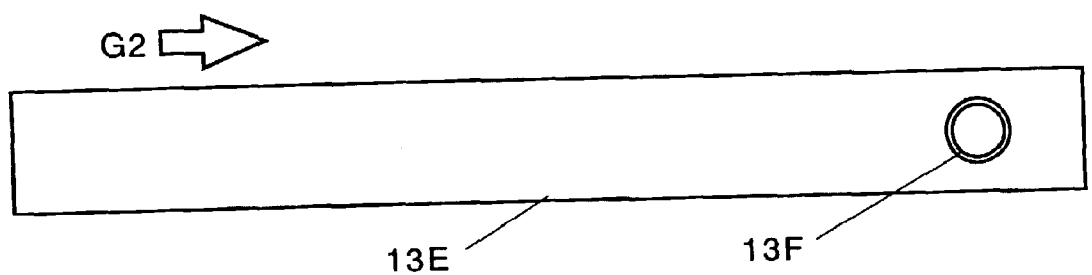
FIG. 1D is a view in the direction of the arrow in FIG. 1C of a riser portion of the back enclosure of the portable information processor as the preferred embodiment of the invention.
Figure 2A:
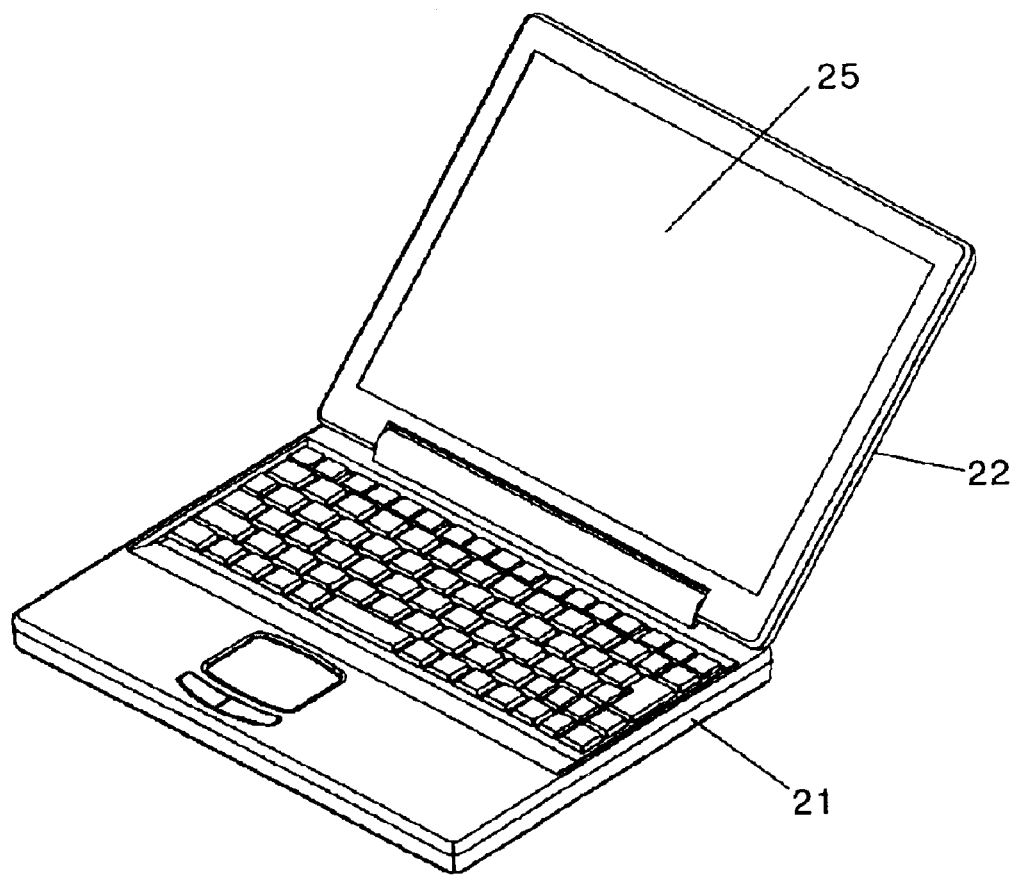
FIG. 2A is an external view in perspective of a conventional portable information processor showing a state with its display portion opened.
Figure 2B:
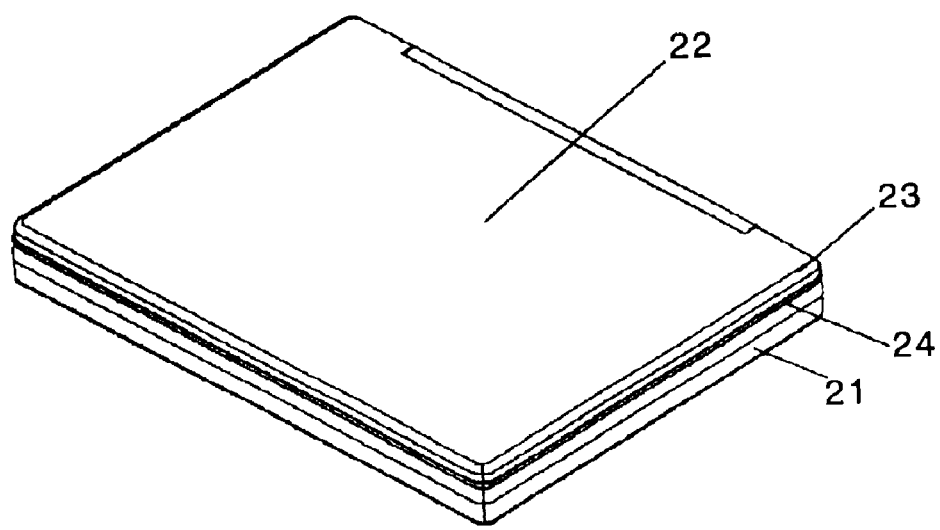
FIG. 2B is an external view in perspective of a conventional portable information processor showing a state with its display portion closed.

The flow of molten metal, however, is required to be controlled on the downstream side of the molten metal flow. It is because the flow of the molten metal concentrates around the riser portion 13E so that the molten metal is not supplied well to the downstream side of elevated portion 13D and cavities are produced there. To prevent occurrence of such a phenomenon in the present preferred embodiment, a protrusion is provided on the metal mold at a position corresponding to the downstream side of riser portion 13E. With this arrangement, the flow of molten metal is supplied to elevated portion 13D with its flow restricted around the position on the downstream side of riser portion 13E. As a result, enclosure 13 has a thin-walled portion 13F on the downstream side of riser portion 13E as shown in FIG. 1C. FIG. 1D is a view of the riser portion 13E in the direction of the arrow in FIG. 1C.

Figure 3:
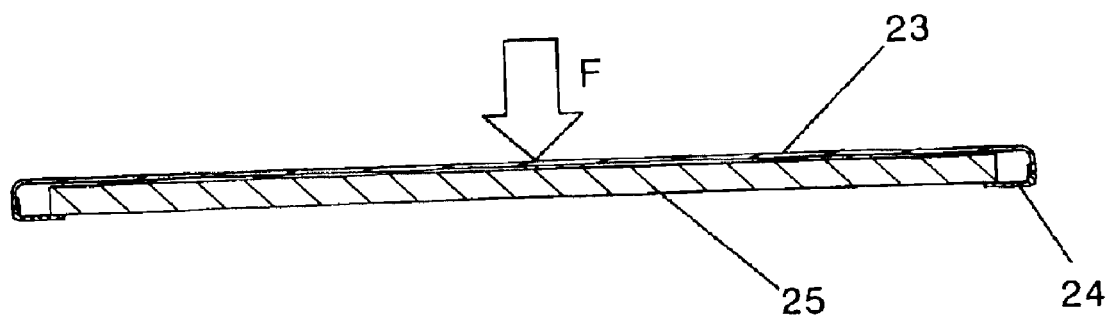
FIG. 3 is a sectional view of the display portion of a conventional portable information processor.

When external force F is applied to back enclosure 13 of the portable information processor of the present preferred embodiment configured as described above, the back enclosure 13 provided with elevated portion 13D has a greater value of second moment of area than that in the conventional art shown in FIG. 3. Therefore, the present preferred embodiment has a higher strength and produces a smaller deflection than the prior art with the same wall thickness T2 of flat portion 13A. Accordingly, wall thickness T2 of flat portion 13A can be made thinner than that of the prior art within acceptable limits of deflection.

From the point of view of strength, higher strength is obtained according as the elevated level of elevated portion 13D is made higher and elevated portion 13D is remodeled into a plurality of elevated portions. However, such configurations impair the fluidity of the molten metal to thereby increase occurrence of cavitation leading to production of defective components due to formation of molten-metal wrinkles and occurrence of cracks. Further, when material wall thickness T1 of riser portion 13E of elevated portion 13D is made greater, the weight of the entire enclosure is increased. Accordingly, those values have to be set optimally. As optimal values, difference in level H1 between elevated portion 13D and flat portion 13A is set to 0.5–5.0 mm, or, preferably, 1.0–3.0 mm; basic wall thickness T1 of riser portion 13E is set to 1.2–2 times as large as the basic wall thickness of flat portion 13A, namely, to 0.6–3.0 mm, or, preferably, 0.8–2.0 mm. Thereby, compatibility between the fluidity of the molten metal and the strength of back enclosure 13 is attained. When a magnesium alloy is used in the described configurations, basic wall thickness T2 of flat portion 13A can be reduced to approximately 0.5 mm.

In the present preferred embodiment, as described above, the enclosure produced by a metal molding withstands external forces even if the wall thickness of the enclosure is reduced. Further, while the enclosure part is molded, cavitation liable to occur at the portion where the shape varies is prevented and production of defective components due to formation of molten-metal wrinkles and cracks is minimized. Thus, a portable information processor not impairing moldability while its components are manufactured by metal molding, having higher endurance to external forces, and being lighter in weight is provided.

Although a magnesium alloy is used in the present preferred embodiment as the material of the molded-metal enclosure, it is possible to reduce the wall thickness of the enclosure from that of the conventional art even if another metal such as aluminum is used as the material. Use of a magnesium alloy is preferable if it is desired to minimize the wall thickness to the degree practically possible while keeping the enclosure reasonably strong.

In the present preferred embodiment, liquid crystal display unit 15 is disposed in front of back enclosure 13 improved in strength. Therefore, liquid crystal display unit 15 is protected from external forces applying thereto from behind.

Further, in the present preferred embodiment, a type formed of two flat boxes, one for the display portion and the other for the main body, joined together by a hinge assembly has been described. However, the invention can be applied also to such a portable terminal that is formed of one flat box in which the main body portion has a liquid crystal display unit built thereinto.

Further, in the present preferred embodiment, elevated portion 13D is provided in the center portion of back enclosure 13. However, provision of a stepped portion only at one position is effective in improving the strength. Further, a lowered portion, instead of the elevated portion, may be provided in the center portion of back enclosure 13.

Further, in the present preferred embodiment, thin-walled portion 13F on the downstream side of riser portion 13E is provided as one circular depression as shown in FIG. 1C and FIG. 1D. However, there are no rules as to what shape or number of thin-walled portions should be provided. Namely, a plurality of depressed portions may be provided to restrict the flow of the molten metal. Otherwise, the thin-walled portion may be given a tapered-off profile. Any form or profile to suitably restrict the flow of the molten metal on the downstream side of riser portion 13E as compared with that on the upstream side may be applicable.

What is claimed is:

1. A portable information processor comprising:
a first enclosure having a first enclosure width greater than a first enclosure length and made of a metal molding having a rectangular flat portion and a stepped portion situated at a different level than said flat portion;
a riser portion which situates said stepped portion at said different level than said flat portion which has a riser length greater than a riser width, said riser width extending between said rectangular flat portion and said stepped portion;
a second enclosure, together with said first enclosure, forming a box; and
an information processing unit housed in any one of said first enclosure and said second enclosure.

2. The portable information processor according to claim 1, wherein said stepped portion is extended from said one side of said flat portion to a side opposite to said one side.

3. The portable information processor according to claim 1, wherein said stepped portion is disposed in a center portion of said first enclosure.

4. The portable information processor according to claim 1, wherein said stepped portion is an upward-bulging elevated portion.

5. The portable Information processor according to claim 4, wherein said flat portion and said elevated portion have a difference in level of 0.5 mm to 5.0 mm therebetween.

6. The portable information processor according to claim 4, wherein width of said elevated portion is at least one-third and at most two-thirds of entire width of said first enclosure.

7. The portable information processor according to claim 4, wherein said riser portion of said elevated portion has a basic wall thickness greater than a basic wall thickness of said flat portion.

8. The portable information processor according to claim 7, wherein the riser portion of said elevated portion has a basic wall thickness of at least 0.6 mm and at most 3.0 mm.

9. The portable information processor according to claim 1, further comprising a liquid crystal display unit housed In any one of the first enclosure and the second enclosure.

10. The portable information processor according to claim 9, wherein said liquid crystal display unit is disposed in front of said first enclosure.

11. The portable information processor according to claim 1, wherein said metal includes magnesium.

12. The portable information processor according to claim 1, wherein said riser portion has a thin-walled portion thinner than other portions of said riser portion.

13. The portable information processor according to claim 12, wherein said thin-walled portion is situated closer to one end of said riser portion along said riser length than to an opposite end.

* * * * *